United States Patent [19]

Watt

[11] Patent Number: 5,181,620
[45] Date of Patent: Jan. 26, 1993

[54] COUNTERBALANCE MECHANISM

[75] Inventor: Richard L. Watt, Jamestown, N.Y.

[73] Assignee: Weber-Knapp Company, Jamestown, N.Y.

[21] Appl. No.: 710,105

[22] Filed: Jun. 4, 1991

[51] Int. Cl.⁵ ............................................. A47F 5/00
[52] U.S. Cl. .................... 211/59.3; 108/136; 312/71
[58] Field of Search .................. 211/59.3; 108/136; 312/71, 42

[56] References Cited

U.S. PATENT DOCUMENTS

| | | | |
|---|---|---|---|
| 2,604,996 | 7/1952 | Smith | 211/49 |
| 2,932,403 | 4/1960 | Vershbow | 211/49 |
| 3,436,136 | 4/1969 | McKechnie | 312/71 |
| 3,807,821 | 4/1974 | Olsson | 312/71 |
| 3,820,478 | 6/1974 | Bergenthal | 108/136 |
| 3,871,725 | 3/1975 | Vilen et al. | 312/71 |
| 4,009,915 | 3/1977 | Whitelaw et al. | 312/71 |
| 4,130,069 | 12/1978 | Evans et al. | 108/136 |
| 4,360,180 | 11/1982 | Bruneau | 248/162.1 |
| 4,559,879 | 12/1985 | Hausser | 108/136 |
| 4,605,189 | 8/1986 | Bruneau | 248/162.1 |
| 4,627,591 | 12/1986 | Heckmann | 248/411 |
| 4,828,119 | 5/1989 | Pingelton | 211/59.3 |
| 4,898,103 | 2/1990 | Pontoppidan et al. | 108/144 |
| 5,119,946 | 6/1992 | Baker | 211/59.3 |

Primary Examiner—Robert W. Gibson, Jr.
Attorney, Agent, or Firm—Bean, Kauffman & Spencer

[57] ABSTRACT

A mechanism for use in counterbalancing a shelf or the like incident to vertical movement thereof along a trackway featuring a linkage assembly and coupling assemblies for effecting a relatively large displacement of the shelf incident to a relatively small displacement of a shelf counterbalance spring. The shelf is mounted on the trackway by followers carrying a manual brake releasably engageable with the trackway.

9 Claims, 3 Drawing Sheets

COUNTERBALANCE MECHANISM

BACKGROUND OF THE INVENTION

It is known to provide shelf lifting or counterbalance mechanisms of the type including a frame for mounting a shelf support for vertical movement under the control or influence of a spring device coupled to the shelf support by a cable system. Prior patents disclosing this type of mechanism includes U.S. Pat. Nos. 2,604,996; 2,932,403; 3,436,136; 3,807,821; 3,820,478; 3,871,725; 4,009,915; 4,559,879; 4,605,189; 4,828,119; 4,898,103. Of these patents, U.S. Pat. No. 3,807,821 proposes the use of a lever assembly for connecting a spring to a cable system in such a manner that the extent of travel of shelf support exceeds the extent of travel of the spring.

SUMMARY OF THE INVENTION

The present invention relates to an improved mechanism for use in counterbalancing a shelf or the like incident to vertical movement thereof and more particularly to a relatively compact mechanism of this type wherein a relatively small spring displacement occurs coincident to a relatively large displacement of the shelf.

The mechanism of the present invention features an improved linkage assembly adapted to uniformly apply a spring bias to a pair of coupling assemblies and in turn to opposite sides of a shelf support at the points at which the latter is guided for vertical displacement by a pair of guide tracks, whereby the shelf support is exposed to uniform counterbalancing forces.

The mechanism of the present invention additionally features improved follower devices for guiding a shelf for vertical displacement relative to the guide tracks. The follower devices incorporate manually operated brake assemblies constructed so as to allow automatic raising of the shelf, whenever a load of predetermined weight is removed from the shelf mounted on the shelf.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
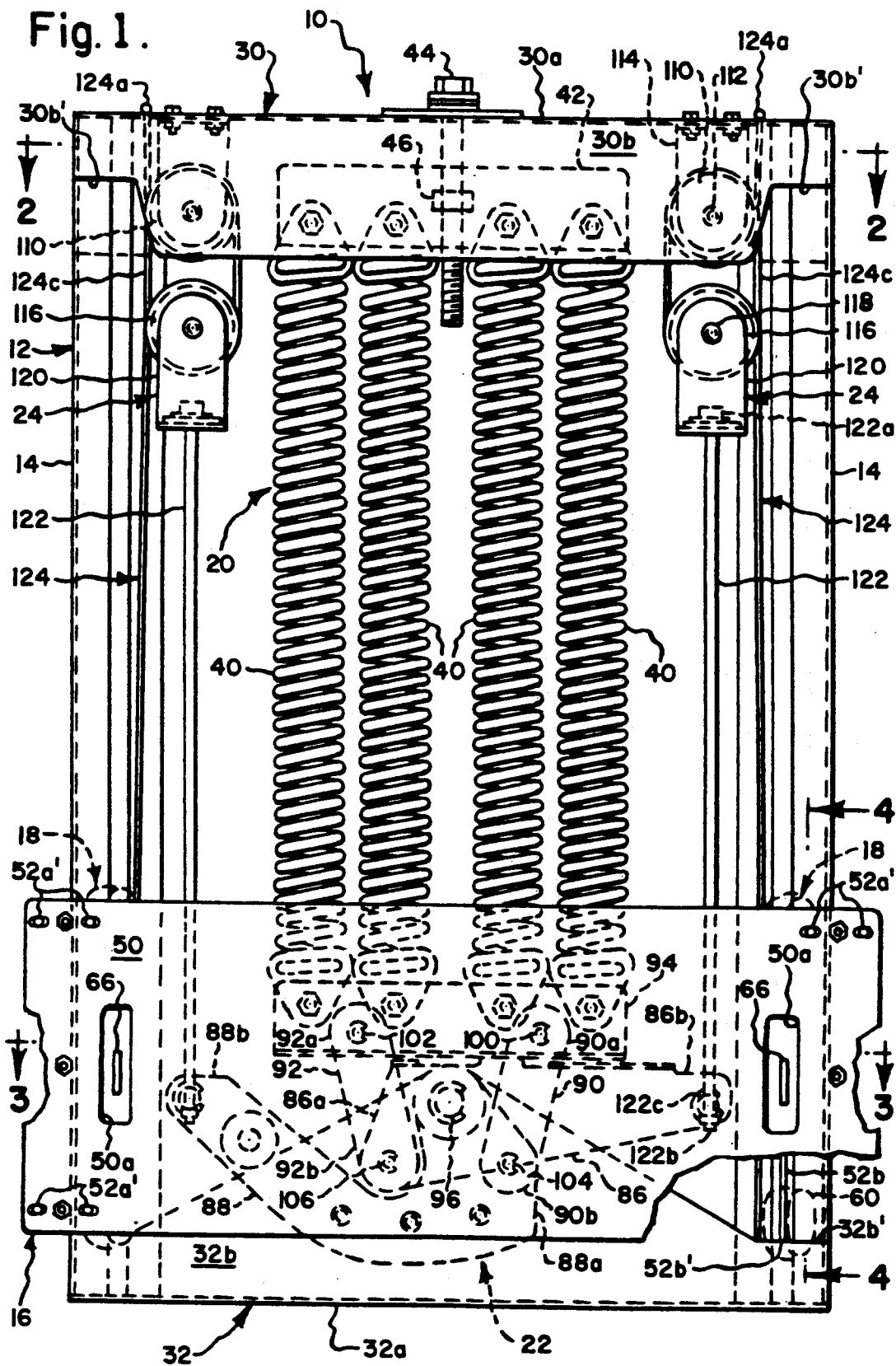
FIG. 1 is a front elevational view of a counterbalance mechanism formed in accordance with a preferred form of the present invention.

A counterbalance mechanism formed in accordance with a preferred form of the present invention is designated as 10 in FIG. 1. As viewed in FIG. 1, mechanism 10 generally includes a frame 12 having a pair of parallel right and left hand guide tracks 14,14; a shelf support 16 having a pair of right and left hand follower devices 18,18 movably associated one with each of the guide tracks for supporting the shelf support for movement lengthwise thereof; a counterbalance spring means 20; spring displacement multiplying linkage assembly 22 operably coupled to the frame by the spring means; and a pair of right and left hand coupling assemblies 24,24 for coupling the linkage assembly to the shelf support.

As desired, frame 12 may be suitably fixed to a vertically extending or horizontally disposed support, not shown, in order to arrange guide tracks 14,14 to extend vertically, and a shelf, not shown, may be cantilever or otherwise suitably affixed to shelf support 16, such that the shelf is generally horizontally disposed and supported for vertical movement lengthwise of the guide tracks with the weight of such shelf, any object supported thereon and the shelf support being at least partially counterbalanced by the bias established by counterbalance spring means 20. The structure of the shelf and the mode of attaching frame 12 to its support and the shelf to shelf support 16 may be conventional and form no part of the present invention.

The term shelf as used herein is intended to include any fixture adapted to support an art device, such as for example a keyboard, or to provide a work surface, such as for example the top of a drafting table, whose weight is desired to be at least partially counterbalanced throughout a range of vertical travel.

Figure 2:
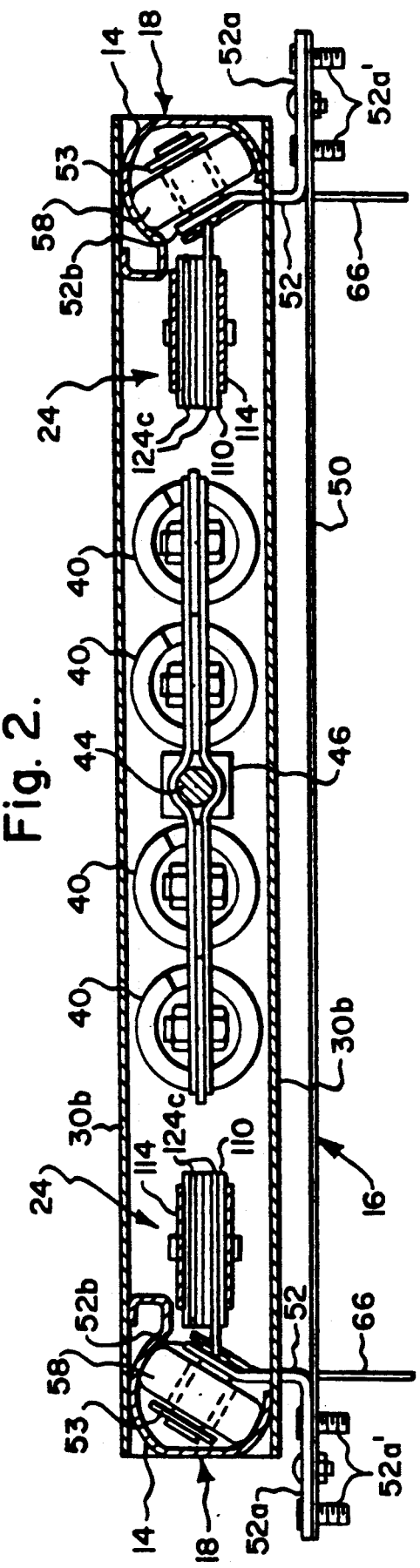
FIG. 2 is a sectional view taken generally along the line 2—2 in FIG. 1.
Figure 3:
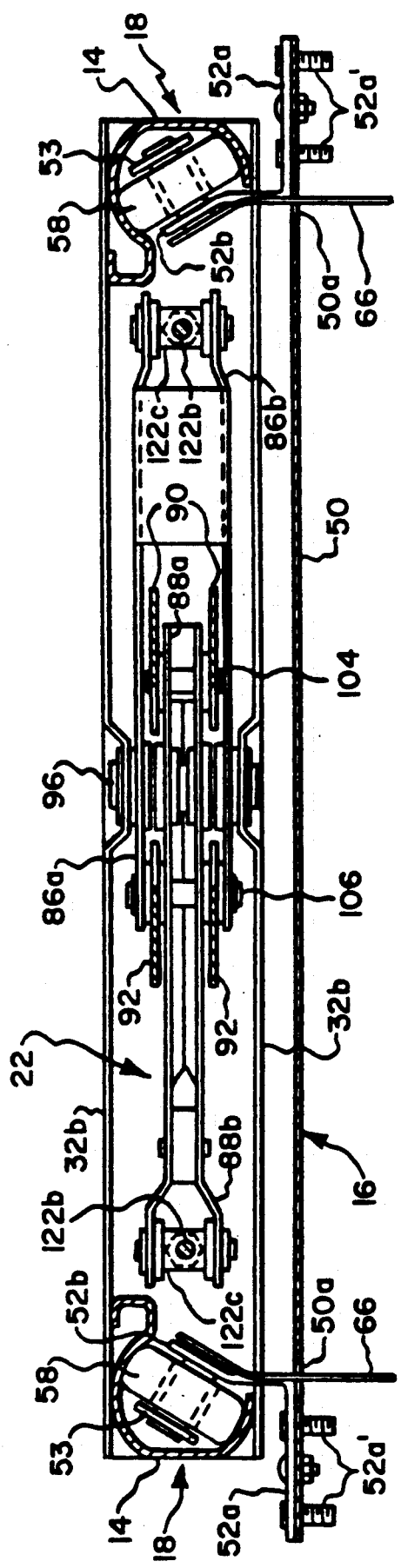
FIG. 3 is a sectional view taken generally along the line 3—3 in FIG. 1.

Frame 12 is shown in FIGS. 1-3, as having upper and lower generally parallel, U-shaped support channel members 30 and 32 having generally horizontally disposed connecting flanges 30a and 32a and generally vertically disposed and aligned side flanges 30b,30b and 32b,32b. Guide tracks 14,14 are of generally C-shaped configuration and have their upper and lower ends received within and suitably fixed to opposite ends of channel members 30 and 32 to define a generally rectangular open center frame structure, wherein the interiors of the channel members and interiors of guide tracks open towards one another.

Counterbalance spring means 20 may be variously defined, so long as it is capable of producing a force adapted for use in counterbalancing the weight of shelf support 16, the shelf and any art device intended to be supported by the shelf. In the presently preferred construction, spring means 20 is shown as comprising a plurality of parallel, tension type springs, such as coil springs 40—40, whose first or upper ends are fixed to a common hanger bracket 42, which is in turn adjustably fixed to depend from connecting flange 30a of upper channel member 30 by an adjustment bolt 44 having an upper end rotatably supported by the connecting flange and a lower end threadably received within a nut 46 associated with the common hanger bracket. The second or lower ends of springs 40—40 are fixed to linkage assembly 22 in the manner to be described. Alternately, by appropriate rearrangement of the elements of mechanism 10, the tension springs may be replaced by a compression spring, such as may be defined by a gas cylinder.

Figure 4:
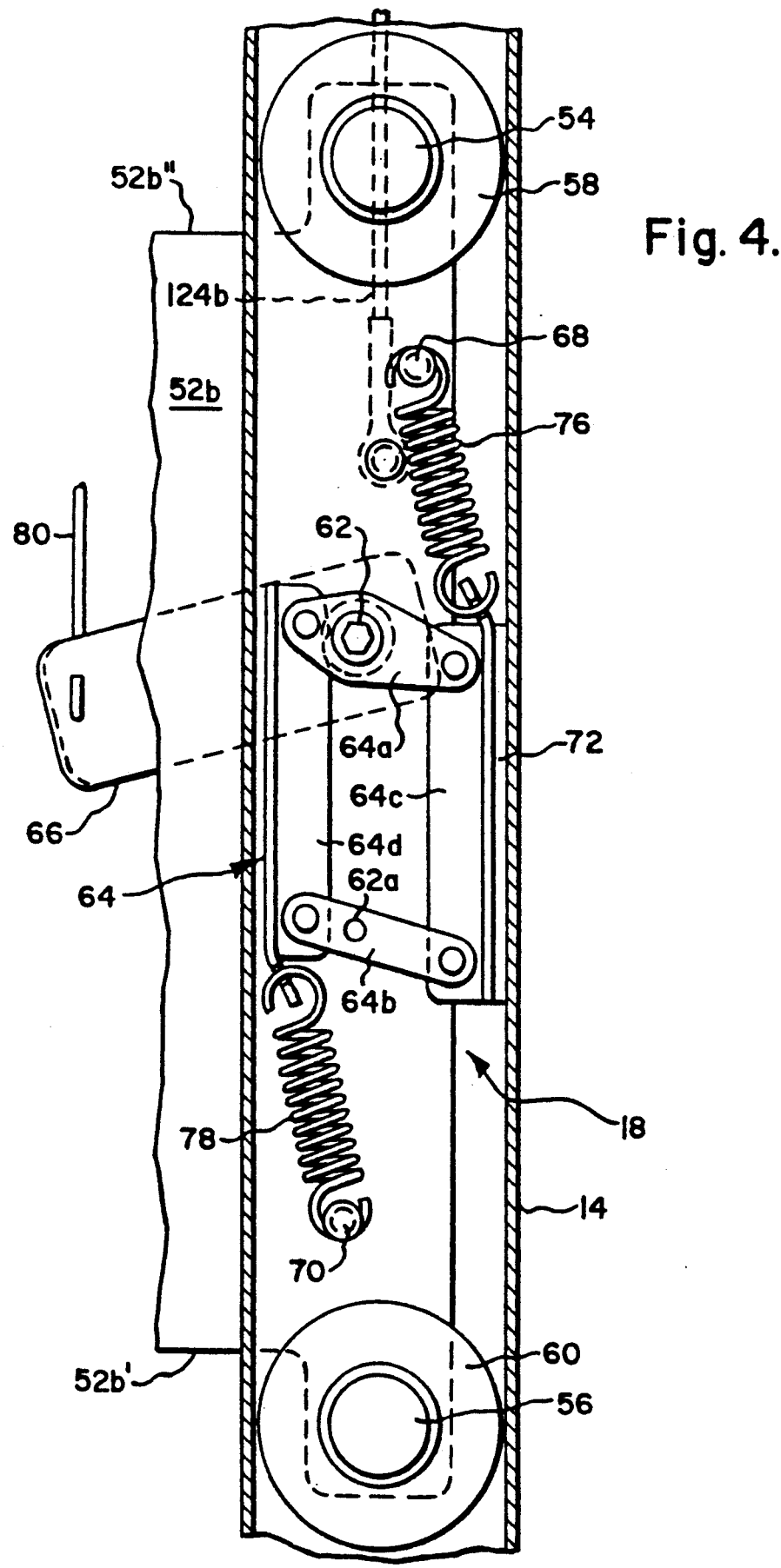
FIG. 4 is a sectional view taken generally along the line 4—4 in FIG. 1.

Shelf support 16 is shown in FIGS. 1 and 2 as being in the form of a generally rectangular connecting plate 50 having follower devices 18,18 fixed to its horizontally opposite ends. Follower devices 18,18 are of mirror image construction and, as best shown in FIGS. 3 and 4, each includes a generally L-shaped mounting bracket 52 having a base flange 52a fixed to plate 50 and a bearing flange 52b. As best shown in FIG. 4, bearing flange 52b serves to mount upper and lower bearing pins 54 and 56 for rotatably supporting crowned periphery guide track follower rollers 58 and 60, respectively; an intermediate bearing pin 62 serving to mount on its opposite ends and adjacent opposite sides of the bearing flange, a brake assembly 64 and a brake release link 66;

a second bearing pin 62a; and upper and lower spring mounting pins 68 and 70. A second bearing flange 53; shown only in FIGS. 2 and 3, is arranged parallel to bearing flange 52b and is connected to opposite ends of pins 54, 56, 62, 62a, 68, and 70. Preferably, a shelf to be suppported would be affixed to shelf support 16 by bolts 52a carried by base flanges 52a and arranged to freely extend through plate 50.

Brake assembly 64 includes a parallelogram linkage defined by pivotably end connected first, second, third, and fourth links 64a, 64b, 64c, and 64d, respectively; a friction brake pad 72 carried by third link 64c to releasably engage with an inner surface of an associated guide track 14; and a pair of springs 76 and 78 having their opposite ends coupled to mounting pin 68 and an upper end of third link 64c and to mounting pin 70 and a lower end of the fourth link 64d, respectively. As will be apparent from viewing FIG. 4, springs 76 and 78 provide a bias tending to maintain the links of brake assembly 64 in their illustrated normal braking position, wherein friction pad 72 is forced into frictional engagement with one side of guide track 14 and rollers 58 and 60 are forced into engagement with an opposite side of the guide track to oppose lowering of shelf support 16 relative to frame 12. The arrangement of links 64a-64d is such that the frictional braking force is automatically increased as downwardly directed force applied to shelf support 16 is increased. The links of brake assembly 64 may be moved from their normal braking position against the bias of springs 76 and 78 by the manual application of a release force to brake release link 66, such as by a release cable or link 80, which serves to pivot the brake release link, and thus bearing pin 62 and first link 64a, in a clockwise direction, as viewed in FIG. 4. As shown in FIGS. 1 and 3, the free ends of brake release links 66,66 freely pass forwardly through slots 50a,50a provided in plate 50. Typically, an upper end of each cable 80, not shown, would be connected to a cable operator, also not shown, carried for movement with the shelf.

By again referring to FIG. 4, it will be noted that the point of connection of bearing pin 62 to first link 64a is offset from the center of the first link in a direction relatively towards its pivot connection with fourth link 64d, and that the point of connection of bearing pin 62a to second link 64b is also offset from the center of the second link in a direction relatively towards its pivot connection with the fourth link. This facilitates release of brake pad 72 from frictional engagement with the inner surface of guide track 14 incident to unlocking rotation of brake release link 66. Also, this facilitates sliding of the brake pad upwardly with respect to the inner surface of the guide track when a shelf supported by shelf support 16 is manually lifted or when a heavy load is removed from the shelf and the bias established by springs 40—40 is adjusted/designed such that the weight of the shelf, etc., absent such load, is exceeded by the counterbalance or lifting force established by the springs.

By again viewing FIGS. 3 and 4, it will be understood that the rotational axes of guide rollers 58 and 60 of the respective follower devices are parallel to each other and generally horizontally disposed, but that the rotational axes of the guide rollers of the left and right hand follower devices, as viewed in FIG. 3, converge in a direction towards plate 50. This canting of the guide rollers 58 and 60 permits the guide rollers to cooperate with guide tracks 14, 14 to constrain horizontal movements of shelf support 16 within a plane disposed normal to the guide tracks.

If desired, the lowermost and uppermost adjusted position of shelf support 16 may be defined by engagement of the lower and upper edges 52b' and 52b" of bearing flanges 52b with upper and lower edges 32b' and 30b' of lower and upper channel side flanges 32b and 30b, respectively.

Linkage assembly 22 is shown in FIGS. 1 and 3 as including crossed first and second elongated force transmitting arms 86 and 88; having adjacent first ends 86a and 88a and remote second ends 86b and 88b. Pairs of first or right hand and second or left hand links 90 and 92; and a common attachment link or bracket 94. Arms 86 and 88 are preferably pivotably supported by a common horizontally disposed pivot pin 96, which extends through the arms relatively adjacent their first ends 86a and 88a, and has its channel member 32. First and second links 90 and 92 are shown in FIG. 1 as being disposed on opposite sides of pivot pin 96 with their upper or first ends 90a and 92a pivotably connected to opposite or the right and left hand ends of attachment link 94 by pivot pins 100 and 102 and with their lower or second ends 90b and 92b pivotally connected to first ends 88a and 86a of arms 88 and 86 by pivot pins 104 and 106. With this arrangement, arms 86 and 88 are caused to rotate or pivot in opposite directions about common pivot pin 96 incident to vertical displacements of attachment link 94 with their second ends 86b and 88b moving in a common direction opposite to the direction of movement of the attachment link. Moreover, the placement of pivot pin 96 relatively closer to first ends 86a and 88a, than to second ends 86b and 88b results in such second ends undergoing a greater vertical displacement than attachment link 94 incident to any vertical displacement of the latter.

Coupling assemblies 24,24 each include a first double sheaved pulley 110 supported for rotation by a bearing pin 112, whose opposite ends are supported by the legs of a U-shaped bracket 114 fixed to depend from connecting flange 30a of upper channel number 30; a second single sheaved pulley 116 supported for rotation by a bearing pin 118, whose opposite ends are supported by the legs of a U-shaped bracket 120; a relatively rigid connecting rod 122 having an upper end 122a connected to bracket 120 and a lower end 122b pivotably connected to the second end of one of arms 86 and 88 by a bearing 122a; and a flexible cable 124 having a first end 124a fixed to connecting flange 30a, a second end 124b fixed to shelf support 16 and an intermediate portion 124c trained about pulleys 110 and 116.

In operation, springs 40 tend to exert a bias or lifting force on attachment link 94, which acts through first and second links 90 and 92 and first and second arms 86 and 88 to apply a downwardly directed or tension force to connecting rods 122,122. The tension force applied to connecting rods 122,122 tends to draw second pulleys 116,116 downwardly relative to first pulleys 110,110, thereby tending to increase the length of cable intermediate portion 124c,124c passing between the first and second pulleys and as a result, tends to raise cable second portions 124b,124b together with shelf support 16 and the shelf supported thereby. The lifting or counterbalance force applied to shelf support 16 by springs 40 may be adjusted by rotating bolt 44 for purposes of raising or lowering common hanger bracket 42.

The construction of linkage assembly 22 and its mode of attachment to springs 40 and shelf support 16 provides for the uniform application of counterbalancing force to opposite sides of the shelf support.

The mechanism is designed for use with a given range of shelf loading conditions, and within this range the shelf tends to reside in any position it is placed by an operator, as by either lifting the shelf with or without first releasing brake assembly 64 or by lowering the shelf after the brake assembly has been released. Moreover, the construction of the brake assembly is intended to allow the shelf to slowly raise automatically without operator intervention, when a load, which is relatively heavy compared to the overall weight of the shelf and movable portions of the mechanisms, is removed from the shelf.

What is claimed is:

1. A counterbalance mechanism for supporting a shelf for vertical movement, said mechanism comprising in combination:

a frame including a pair of vertically extending guide tracks;
   shelf support means including a pair of followers movable along said pair of guides;
   counterbalance spring means having a first end connected to said frame and a second end;
   a pair of coupling means having first ends connected to said shelf support means and second ends; and
   a linkage assembly having one end connected to said second end of said spring means and a second end, said second end of said linkage assembly including first and second force transmitting arms connected one to each of said second ends of said pair of coupling means, and said linkage assembly being operable for causing said first ends of said coupling to move through a uniform distance as a result of movement of said second end of said spring means and through a distance which exceeds said distance which said second end of said spring means is moved.

2. A mechanism according to claim 1, wherein said arms have relatively adjacently disposed ends and relatively remotely disposed ends, and said linkage assembly further includes pivot means for supporting said arms relatively adjacent said adjacent ends thereof, first and second links and an attachment link having opposite ends, said first and second links having first ends pivotably connected to said attachment link adjacent said opposite ends thereof and second ends pivotably connected to said adjacent ends of said arms, characterized in that vertical movement of said attachment link in one direction causes vertical movement of said remote ends of said arms in an opposite direction.

3. A mechanism according to claim 1, wherein each of said guide tracks has an inner guide surface; and each of said followers includes a mounting bracket, upper and lower guide rollers rotatably supported by said mounting bracket for engagement with said guide surface, a parallelogram linkage having first, second, third, and fourth pivotably end connected links, said second and fourth links being arranged in facing relationship to said guide surface and said second link mounting friction braking material arranged to removably frictionally engage with said guide surface, a brake/release link, a bearing pin rotatably supported by said mounting bracket and carrying said release link and said first link for rotation therewith, and spring means opposite end connected to said mounting bracket and said parallelogram linkage for establishing a force for normally maintaining said friction braking material in frictional engagement with said guide surface to oppose movement of said shelf support means relative to said frame, said operating link being operable to rotate said bearing pin to remove said frictional braking material from frictional engagement with said guide surface, and said bearing pin mounts said first link for rotation about an axis arranged relatively closer to the pivot connection of said first link with said fourth link than to the pivot connection of said first link with said second link, and said parallelogram linkage is arranged such that downwardly directed and upwardly directed movement of said friction braking material relative to said guide surface, while engaged therewith tends to increase and decrease said force, respectively.

4. A mechanism according to claim 1, wherein said upper and lower rollers have essentially parallel axes of rotation and said axes of said rollers of said followers converge in a direction away from said frame.

5. A counterbalance mechanism for supporting a shelf for vertical movement, said mechanism comprising:

a frame intended to be disposed in an upstanding condition and including upper and lower members fixed to upper and lower ends of a pair of guide tracks arranged in a right hand and left hand relationship when said frame is viewed in side elevation;
   a shelf support including right and left hand followers movable along said right and left hand guide tracks for supporting said shelf support for vertical movement;
   spring means having an upper end fixed to depend from said upper member and a lower end;
   right and left hand coupling assemblies each including a first pulley fixed to depend from said upper member, a second pulley, a cable, and a tension member supported by said second pulley to depend vertically therefrom, each said cable having one end fixed with reference to said upper member, a second end fixed to said shelf support and an intermediate portion trained about said first and second pulleys whereby to support said second pulley for vertical movement relative to said first pulley; and
   a linkage assembly for connecting said lower end of said spring means to said tension member of each of said coupling assemblies to provide for counterbalancing of said shelf support, said linkage assembly having a first and second arms supported for vertically directed pivotal movement by pivot means carried by said lower member, right and left hand links and an attachment link attached to said second end of said spring means and having horizontally spaced right and left hand ends, said first and second arms having first ends disposed remotely of said pivot means and connected to said tension member of said right and left hand assemblies, respectively, and second ends disposed relatively adjacent said pivot means and on a side thereof opposite said first ends of said arms, said left hand link having an upper end coupled to said left hand end of said attachment link and a lower end coupled to said second end of said first arm, said right hand link having an upper end coupled to said right hand end of said attachment link and a lower end coupled to said second end of said second link.

6. A mechanism according to claim 5, wherein said pivot means supports said arms for pivotal movement about a common axis.

7. A mechanism according to claim 5, wherein each of said guide tracks has an inner guide surface; and each of said followers includes a mounting bracket, upper and lower guide rollers rotatably supported by said mounting bracket for engagement with said guide surface, a parallelogram linkage having first, second, third, and fourth pivotably end connected links, said second and fourth links being arranged in facing relationship to said guide surface and said second link mounting friction braking material arranged to removably frictionally engage with said guide surface, a brake/release link, a bearing pin rotatably supported by said mounting bracket and carrying said release link and said first link for rotation therewith, and spring means opposite end connected to said mounting bracket and said parallelogram linkage for establishing a force for normally maintaining said friction braking material in frictional engagement with said guide surface to oppose movement of said shelf relative to said frame, said operating link being operable to rotate said bearing pin to remove said frictional braking material from frictional engagement with said guide surface, and said bearing pin mounts said first link for rotation about an axis arranged relatively closer to the pivot connection of said first link with said fourth link than to the pivot connection of said first link with said second link, and said parallelogram linkage is arranged such that downwardly directed and upwardly directed movement of said friction braking material relative to said guide surface, while engaged therewith tends to increase and decrease said force, respectively.

8. A counterbalance mechanism for supporting a shelf for vertical movement comprising in combination:
   a frame mounting a pair of vertically extending guide tracks having an inner guide surface;
   a support for said shelf including a pair of followers for mounting said shelf on said guide tracks for vertical movement lengthwise thereof and a follower connecting plate; and
   means connecting said support to said frame for counterbalancing at least a portion of the weight of said support and said shelf; and each of said followers includes a mounting bracket adapted to be fixed to said shelf, upper and lower guide rollers rotatably supported by said mounting bracket and to engage with said guide surface, a parallelogram linkage having first, second, third, and fourth pivotably end connected links, said second and fourth links being arranged in facing relationship to said guide surface and said second link mounting friction braking material arranged to removably frictionally engage with said guide surface, a brake release link, a bearing pin rotatably supported by said mounting bracket and carrying said release link and said first link for rotation therewith, and spring means opposite end connected to said mounting bracket and said parallelogram linkage for establishing a force for normally maintaining said friction braking material in frictional engagement with said guide surface to oppose movement of said support downwardly relative to said frame, said release link being operable to rotate said bearing pin to remove said frictional material from frictional engagement with said guide surface, and said bearing pin mounts said first link for rotation about an axis arranged relatively closer to the pivot connection of said first link with said fourth link than to the pivot connection of said first link with said second link, and said parallelogram linkage is arranged such that downwardly directed and upwardly directed movement of said friction braking material relative to said guide surface, while engaged therewith, tends to increase and decrease said force, respectively.

9. A counterbalance mechanism for supporting a shelf for vertical movement comprising:
   a frame mounting a pair of vertically extending guide tracks;
   a pair of follower means for mounting said shelf on said pair of guide tracks for vertical movement relative to said frame;
   a spring means having a first end connected to said frame and a second end;
   a linkage assembly including an attachment link fixed to said second end of said spring means, first and second links, and crossed force transmitting arms having remote and adjacent ends, and a pivot for mounting said arms for pivotal movement about a common pivot axis arranged closer to said adjacent ends than to said remote ends, said first and second links having first ends pivotally connected to said attachment link and second ends pivotally connected one to each of said adjacent ends of said arms, said arms and said first and second links being arranged such that said remote ends of said arms extend in opposite directions away from said pivot and move in opposite directions relative to said attachment link and through a distance exceeding that of said attachment link; and
   a pair of coupling means having opposite ends thereof connected one to each of said remote ends of said arms and to said follower means.

* * * * *

UNITED STATES PATENT AND TRADEMARK OFFICE
CERTIFICATE OF CORRECTION

PATENT NO. : 5,181,620

DATED : 1/26/93

INVENTOR(S) : Richard L. Watt

It is certified that error appears in the above-identified patent and that said Letters Patent is hereby corrected as shown below:

Col. 4, line 18 - after "its", insert --opposite ends supported by side flanges 32b,32b of lower--

Signed and Sealed this

Twenty-ninth Day of March, 1994

Attest:

BRUCE LEHMAN

Attesting Officer

Commissioner of Patents and Trademarks